United States Patent Office 3,114,756
Patented Dec. 17, 1963

3,114,756
TETRACYANO-BENZOQUINONE-(1,4) AND PROCESS FOR PREPARING IT
Kurt August Wilhelm Wallenfels and Gerhard Bachmann, Freiburg im Breisgau, Germany, assignors to Farbwerke Hoechst Aktiengesellschaft vormals Meister Lucius & Brüning, Frankfurt am Main, Germany, a corporation of Germany
No Drawing. Filed Feb. 6, 1962, Ser. No. 171,342
Claims priority, application Germany Feb. 15, 1961
9 Claims. (Cl. 260—396)

The present invention relates to tetracyano-benzoquinone-(1,4) and to a process for preparing it from 2,5-dicyano-3,6-dihalogeno-benzoquinone, 2,5-dicyano-3,6-dialkoxy-benzoquinone, and 2,5-dicyano-3,6-diamino-benzoquinone.

According to a report in "Berichte der Deutschen Chemischen Gesellschaft," 44, 3469 (1911), the reaction of chloranil with potassium cyanide is said to yield 2,5-dihydroxy-3,6-dicyano-benzoquinone-(1,4), the so-called cyananilic acid. By analysis, however, the compound made according to this method was found to be 2,3-dicyano-5,6-dichlorohydroquinone. In confirmation of the findings of E. A. Braude et al. (Journal Chemical Society, London 1954, 33569), our investigations revealed that it is not possible to introduce further cyano groups into 2,3-dicyano-5,6-dihalogenoquinones or 2,3-dicyano-5,6-dihalogenohydroquinones.

Now, we have found that tetracyano-benzoquinone-(1,4) can be prepared by (a) Causing a lower aliphatic alcohol and an alkali metal cyanide or an alkaline earth metal cyanide to act simultaneously on 2,5-dicyano-3,6-dihalogeno-benzoquinone, or by (b) Causing at first a lower aliphatic alcohol to act on a 2,5-dicyano-3,6-dihalogeno-benzoquinone, and then causing an alkali metal cyanide or an alkaline earth metal cyanide to act on the 2,5-dicyano-3,6-dialkoxy-benzoquinone-(1,4) thus prepared, or by (c) At first hydrolyzing a 2,5-dicyano-3,6-dihalogeno-benzoquinone or the reaction product obtained by the reaction of hydrogen halide with 2,5-dicyano-benzoquinone-(1,4), to form cyananilic acid, dialkylating the latter to yield a 2,5-dicyano-3,6-dialkoxy-benzoquinone-(1,4), and reacting this substance with an alkali metal cyanide or an alkaline earth metal cyanide, or by (d) Transforming a 2,5-dicyano-3,6-dihalogeno-benzoquinone-(1,4) or a 2,5-dicyano-3,6-dialkoxy-benzoquinone-(1,4) prepared therefrom by the reaction with a lower aliphatic alcohol, by treatment with ammonia, a primary or a secondary amine, into the corresponding 2,5-dicyano-3,6-diamino-benzoquinone derivative and then reacting this substance with an alkali metal cyanide or an alkaline earth metal cyanide in the presence of a lower aliphatic alcohol, and converting the tetracyano-hydroquinone so obtained into tetracyano-benzoquinone-(1,4) by a treatment with nitrous gases. (The term "nitrous gases" used here is intended to denote the system $$NO+NO_2 \rightleftharpoons N_2O_3)$$

The course taken by the reaction is illustrated by the following reaction scheme, in which R stands for a low molecular aliphatic radical, N< stands for the radical of a primary or secondary amine or the ammonia radical, X stands for a halogen atom, and Me represents an alkali metal or an alkaline earth metal.

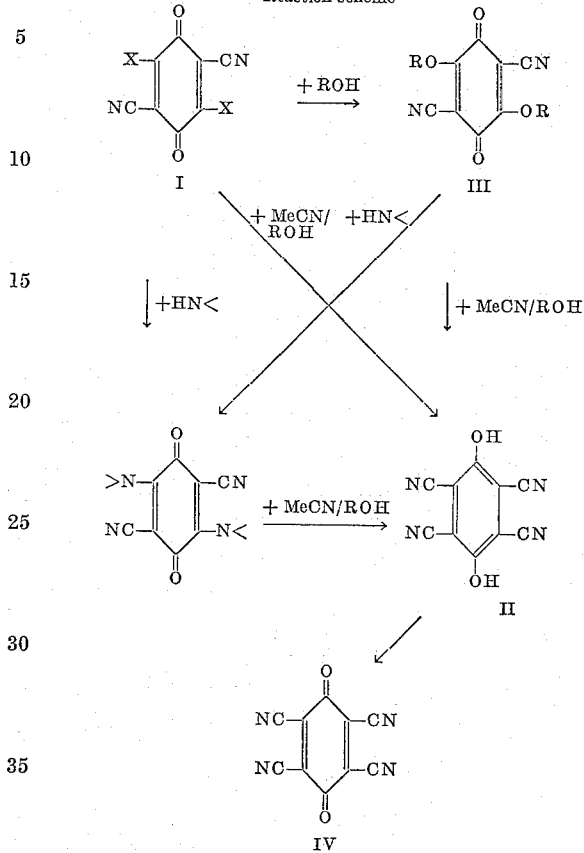

In the cold, compound I reacts slowly with anhydrous alcohols, when heated, however, it reacts rapidly while forming 2,5-dicyano-3,6-dialkoxy-benzoquinone (III); upon heating with a cyanide in alcohol, this compound III passes into the corresponding salt of compound II. The same compound is obtained directly when causing a cyanide and an alcohol to react simultaneously with compound I. The hydroquinone derivative II is oxidized by nitrous gases while forming the quinone IV.

Another variation of the process of the present invention comprises at first hydrolyzing compound I with water to form 2,5-dicyano-3,6-dihydroxy-benzoquinone-(1,4), the real "cyananilic acid," converting the latter, for example by means of diazomethane, into the dimethoxy derivative corresponding to Formula III, and then further carrying out the reaction as described above.

Cyananilic acid may also be obtained by causing hydrogen halide to act on a 2,5-dicyano-benzoquinone-(1,4) obtained by oxidation of 2,5-dicyano-hydroquinone, for example, with nitrous gases, and hydrolyzing the reaction product thus formed.

A further method of preparing tetracyano-hydroquinone comprises converting 2,5-dicyano-3,6-dibromo-benzoquinone-(1,4) or 2,5-dicyano-3,6-dialkoxy-benzoquinone-(1,4) by a treatment with ammonia, primary or secondary amines into the corresponding 2,5-dicyano-3,6-diaminoquinone, treating this compound with a cyanide in the presence of a lower aliphatic alcohol and then oxidizing as described above to produce the quinone of the Formula IV.

For preparing 2,5-dicyano-3,6-diamino derivatives, there may be used primary amines, secondary amines or ammonia. By way of example, there are mentioned: morpholine, piperidine, pyrrolidine, hexylamine, benzylamine, ethyleneimine, methylamine, ethylamine, dimethylamine, diethylamine.

The preparation of the quinones of the Formula I which may be used as starting substances, is illustrated, by way of example, by the synthesis of 2,5-dicyano-3,6-dibromo-benzoquinone-(1,4). This compound can be prepared, for example, by reacting with bromine, according to the method described in the Journal of Organic Chemistry 19, 510 (1954), 2,5-dihydroxy-diethylterephthalate obtained from hydroquinone and carbon dioxide at a temperature of 225° C. and a gauge pressure of 100 atmospheres and subsequent esterification according to the method described in Berichte der Deutschen Chemischen Gesellschaft 21, 1759, (1888), or better in the presence of aluminum chloride, methylating this 2,5-dihydroxy-3,6-dibromo-diethylterephthalate by means of dimethyl sulfate, hydrolyzing the ester groups with alkaline agents, transforming the free carboxylic groups with thionyl chloride into acid chloride groups, transforming these with ammonia into carboxamide groups and subsequently by the action of thionyl chloride into cyano groups, demethylating the 1,4-dimethoxy-2,5-dicyano-3,6-dibromo-benzene so obtained with a mixture of aluminum chloride and sodium chloride at 180° C. and converting the hydroquinone derivative thereby formed by the action of nitrous gases into 2,5-dicyano-3,6-dibromo-benzoquinone-(1,4). Other 3,6-dihalogeno-derivatives may be prepared in analogous manner or according to known halogen exchange processes. Thus, 2,5-dicyano-3,6-dichloro-benzoquinone-(1,4) is obtained when using chlorine instead of bromine in the above-mentioned synthesis. 2,5-dicyano-3,6-dichloro-benzoquinone can also be obtained, for example, in the following manner: chlorine is caused to act on succinylo-diethylsuccinate, whereby 2,5-dicarbethoxy-3,6-dichloro-hydroquinone (M.P. 123–124° C.) is formed in good yield; this compound is transformed into the corresponding hydroquinone-dimethyl ether (M.P. 69° C.) by methylation with, for example, dimethyl-sulfate. Hydrolysis of this compound, for example, with alcoholic potassium lye, yields the free dicarboxylic acid (M.P. 225–230° C.). This acid can be converted advantageously by means of thionyl chloride into the corresponding dichloride which, upon treatment with ammonia, yields 2,5-dicarboxamido-3,6-dichloro-hydroquinone-dimethyl ether (M.P. above 310° C. with decomposition). When reacting this compound with thionyl chloride in dimethylformamide in the cold, there is formed 2,5-dicyano-3,6-dichloro-hydroquinone-dimethyl ether (M.P. 213° C.), which is demethylated by heating it to about 180° C. with aluminum chloride. Oxidation to yield 2,5-dicyano-3,6-dichloride-benzoquinone is carried out advantageously by the action of nitrous gases.

2,5-dicyano-3,6-diiodo-benzoquinones or 2,5-dicyano-3,6-difluoro-benzoquinones which may likewise be used as starting substances for the process of the present invention are obtainable, for example, by the reaction of 2,5-dicyano-3,6-dibromo-benzoquinone with sodium iodide in acetone or by the reaction of 2,5-dicyano-3,6-dichloro-benzoquinone with anhydrous potassium fluoride in dimethylsulfoxide.

Another method for preparing cyananilic acid comprises converting the above-mentioned 2,5-dihydroxy-diethylterephthalate into the corresponding diamide by treatment with ammonia, alkylating both hydroxy groups, converting the carboxamide groups into cyano groups in the manner described above, and dealkylating. The 2,5-dicyano-hydroquinone thus obtained, which may also be brominated, for example, in glacial acetic acid/sodium acetate, can then be easily dehydrogenated with nitrous gases to yield the above-mentioned 2,5-dicyano-benzoquinone-(1,4).

As cyanides, there may be used alkali metal cyanides, especially the sodium and potassium cyanides, as well as alkaline earth metal cyanides, for example, calcium cyanide; as alcohols, there may be used lower alkanols, e.g., those containing 1 to 4 carbon atoms, preferably methanol and ethanol. It is of advantage to use anhydrous alcohols, since with alcohols containing water the yield is reduced owing to the hydrolysis to cyananilic acid.

The process of the present invention is carried out preferably by heating a 2,5-dicyano-3,6-dihalogeno-benzoquinone-(1,4) with a solution or suspension of a cyanide in an anhydrous alcohol, preferably at the reflux temperature of the mixture, and, when the red solution so obtained, which contains the alkali metal salt of the tetracyano-hydroquinone has cooled, introducing hydrogen chloride until the color of the solution turns brown, evaporating the solution to dryness and extracting the residue with a suitable solvent, for example, diethyl ether, and removing the solvent.

In order to purify it, the crude tetracyano-hydroquinone can be converted into a difficultly soluble salt, for example, the morpholino salt which is then split by action of hydrogen chloride.

However, one may also heat 2,5-dicyano-3,6-dihalogeno-benzoquinone-(1,4) at first with an alcohol and heat the dialkoxy derivative so obtained with an alcoholic solution or suspension of a cyanide and then isolate in the manner described above.

In order to convert 2,5-dicyano-3,6-dihalogen-benzoquinones into cyananilic acid, it is suitable to heat the starting substance with a dilute aqueous inorganic base, preferably soda lye and liberate the cyananilic acid by means of an acid. By alkylation, for example, with a diazoalkane, there is obtained a 2,5-dicyano-3,6-dialkoxy-benzoquinone which is further treated in the manner described above.

Via 2,5-dicyano-3,6-diamino-benzoquinone derivatives, tetracyano-hydroquinone is advantageously prepared by causing ammonia or an amine to act on a 2,5-dicyano-3,6-dihalogeno-benzoquinone. As a solvent for this reaction, acetonitrile proved very advantageous. The diamino derivatives may however also be prepared from the above-mentioned dialkoxy derivatives by the reaction with amines. The reaction of cyanides with these diamino derivatives in the presence of a lower alcohol yields likewise tetracyano-hydroquinone.

The transformation of the tetracyano-hydroquinone into the quinone derivative is suitably effected by taking up the hydroquinone in an inert solvent and stirring it with condensed nitrous gases with exclusion of moisture. As inert solvents, there are suitable, for example, carbon tetrachloride, methylene chloride, and chloroform.

The yellow product is subsequently filtered off and, if required, purified by dissolving in, for example, methylene chloride or dichloroethane, and removing the solvent.

The product of the present invention is an extraordinary oxidizing agent. By contacting with, for example alcohol or water (acidic or alkaline) it is reduced to the corresponding hydroquinone; it is also reduced in methylene chloride solution upon the addition of tetraline, triphenylmethane or p-xylene.

The product of the present invention has further the property of forming deeply coloured complexes with aromatic compounds, for example, with benzene, toluene, xylene, naphthalene, pyrene, chrysene, etc.

The pyrene complex is blue green in solution. It precipitates from methylene chloride in the form of copper-lustering crystals which do not melt when heated to 350° C. Its analysis (Calculated: 76.10% C; 2.40% H. Found: 76.26% C; 2.67% H.) reveals that this is a 1:1 complex. The infrared spectrum shows a shift of the bands to longer wave lengths. Therefore, the product of the present invention may be used as a reagent or for the detection of aromatic compounds.

Even tetracyano-hydroquinone which is produced in the process of the present invention as an intermediate product forms complexes with aromatic compounds. The pyrene complex thereof, in a ratio of 1:1 constitutes red needles which do not melt when heated to 350° C.; the infrared spectrum shows a slight shift of the pyrene bands to shorter wave lengths.

*Analysis.*—Calculated: 75.72% C; 2.91% H. Found: 75.86% C; 2.97% H.

The mentioned complexes of tetracyano-quinone as well as those of the anion radicals which are easily obtainable from tetracyano-benzoquinone are distinguished by a very good stability and an extraordinarily high electric conductivity. The products are, therefore, very valuable intermediates for the preparation of compounds having semiconductor properties.

In addition thereto, tetracyano-benzoquinone-(1,4) may also be used as an intermediate for the preparation of pharmaceuticals.

The following examples illustrate the invention but they are not intended to limit it thereto:

EXAMPLE 1

(a) 2,5-Dicyano-3,6-Dimethoxy-Benzoquinone 1 g. of 2,5-dicyano-3,6-dibromo-benzoquinone is boiled up in 20 cc. of absolute methanol; there forms a clear solution from which a yellow powder begins to precipitate already in the heat. The whole is cooled and filtered; there are obtained 0.67 g. of 2,5-dicyano-3,6-dimethoxy-benzoquinone (95% of the theoretical yield).

*Analysis.*—Calculated: 55.05% C; 2.67% H; 12.84% N. Found: 55.29% C; 2.73% H; 12.82% N.

After recrystallization from glacial acetic acid, the compound is found to decompose above 230° C.

(b) Tetracyano-Hydroquinone ($b_1$) *From 2,5-dicyano-3,6-dibromo-benzoquinone.*—4 g. of 2,5-dicyano-3,6-dibromo-benzoquinone are added to a solution of 2.72 g. of sodium cyanide in 200 cc. of absolute methanol and boiled with reflux for half an hour. The red solution so formed is then cooled and hydrogen chloride is introduced until the color of the solution turns brown. The whole is evaporated to dryness and the dry residue is extracted several times with ether. The brown ether extracts that show a green fluorescence are combined and, in order to be purified, they are converted into the morpholino salt. For this conversion, morpholine is added dropwise to the ethereal solution, whereby a red precipitate is formed. This precipitate is suction-filtered, washed with ether and recrystallized from absolute methanol. By the addition of ether to the mother liquor, a second fraction of this salt can be obtained. Thus, the total of morpholine salt obtained is 1.05 g.

The free hydroquinone is obtained by dissolving the salt in an as small quantity of water as possible and strongly acidifying the whole with HCl, which causes green-yellow crystals of the said compound to precipitate. A further quantity of hydroquinone can be obtained when shaking the aqueous solution with ether. The total yield is 0.65 g. (23.7% of the theoretical yield). The compound shows no melting point.

*Analysis.*—Calculated: 57.15% C; 0.952% H; 26.68% N. Found: 57.38% C; 1.03% H; 26.59% N.

The infrared spectrum of the compound shows the nitrile band in addition to a broad OH band at 3175 cm.$^{-1}$. Analysis of the dimorpholine salt of tetracyano-hydroquinone revealed the following values:

Calculated: 56.25% C; 5.21% H. Found: 56.46% C; 5.46% H.

($b_2$) *From 2,5-dicyano-3,6-dimethoxy-benzoquinone.*—1.75 g. of 2,5-dicyano-3,6-dimethoxy-benzoquinone are added to a solution of 1.75 g. of sodium cyanide in 150 cc. of absolute methanol and refluxed for ¼ hour. The quinone dissolves slowly and there is formed a clear red solution showing a red fluorescence. The further treatment is carried out analogously to the method described under ($b_1$). The yield is 0.36 g. (21.4% of the theoretical yield). As a derivative there was prepared with $CH_2N_2$ the dimethyl-ether which constituted yellow needles with green fluorescence.

*Analysis.*—Calculated: 60.50% C; 2.52% H; 23.51% N. Found: 60.83% C; 2.92% H; 22.14% N.

(c) Tetracyano-Benzoquinone 0.2 g. of tetracyano-hydroquinone is suspended in 12 cc. of anhydrous carbon tetrachloride and stirred for one hour with 0.5 cc. of condensed nitrous gases with the exclusion of moisture. The whole is then filtered, washed with anhydrous carbon tetrachloride and the yellow product is then dissolved in methylene chloride. The solution is evaporated to dryness and there is obtained a yellow, feebly brownish crystalline product having a melting point of 205° C. (decomposition) in a practically quantitative yield. The infrared spectrum of this compound reveals in addition to the nitrile and the carbonyl band also an OH band which is probably due to partial reduction to the corresponding hydroquinone by moisture upon trituration with KBr.

EXAMPLE 2

(a) 2,5-dicyano-3,6-dibromo-benzoquinone is boiled up with dilute sodium hydroxide solution until a clear solution is formed. Upon cooling, the sodium salt of the cyananilic acid precipitates in the form of yellow-brown needles. For purification, the product is dissolved in water, filtered and combined with a strong sodium hydroxide solution. The yellow needles that separate thereupon are dissolved in water and cyananilic acid is precipitated therefrom by addition of concentrated hydrochloric acid. This acid crystallizes in yellow needles which can be recrystallized from nitrobenzene. The compound contains 2 mols of crystal water and shows no melting point.

*Analysis.*—$C_8H_2N_2O_4 \cdot 2H_2O$. Calculated: 42.40% C; 2.66% H; 12.40% N. Found: 42.25% C; 3.32% H; 12.38% N.

The tetraacetyl compound obtained by reductive acetylation of cyananilic acid is found to melt at 235° C.; by analysis the following values were determined:

Calculated: 53.40% C; 3.34% H; 7.78% N. Found: 53.61% C; 3.60% H; 7.57% N.

When treating dicyano-dimethoxy-benzoquinone with a sodium hydroxide solution according to the method described in Example 1(a), there is likewise obtained cyananilic acid.

(b) To 0.2 g. of cyananilic acid, dissolved in a small quantity of methanol, is added an excess quantity of diazomethane in ether. Reaction occurs violently and a yellow crystalline powder separates soon.

There is obtained 0.1 g. (44% of the theoretical yield) of 2,5-dicyano-3,6-dimethoxy-benzoquinone which shows no depression of the melting point with the product prepared according to Example 1(a).

The further reaction is carried out according to Examples 1($b_2$) and (c).

EXAMPLE 3

2,5-Dicyano-3,6-Dimorpholino-Benzoquinone 150 mg. of 2,5-dicyano-3,6-dimethoxy-benzoquinone are dissolved in 20 cc. of hot anhydrous acetonitrile and 0.5 cc. of morpholine is added thereto. The whole is shortly heated, whereupon a dark red solution is formed from which red needles separate on cooling. These needles are filtered off and washed with cold acetonitrile. For purification, the compound can be recrystallized from glacial acetic acid. The yield is 190 mg. (84.54% of the theoretical yield).

*Analysis.*—Calculated: 58.50% C; 4.88% H; 17.08% N. Found: 58.29% C; 4.89% H; 17.27% N.

Infrared spectrum: C≡N: 2191 cm.$^{-1}$; C=O: 1629 cm.$^{-1}$. Melting point: 230–231° C. (decomposition, deflagration with evolution of gas).

According to the method described in Example 3, there can also be prepared further dicyano-diamino-quinones, for example:

*2,5 - dicyano-3,6-dipiperidino-benzoquinone.*—Red needles. Infrared spectrum: C≡N: 2190 cm.$^{-1}$; C=O: 1629 cm.$^{-1}$. Melting point: 190–191° C. (decomposition).

*2,5 - dicyano-3,6-diethyleneimino-benzoquinone.*—Yellow needles. Infrared spectrum: C≡N: 2200 cm.$^{-1}$; C=O (weak): 1645 cm.$^{-1}$. Melting point: does not melt up to 300° C., from 200° C. upwards slow darkening.

*2,5 - dicyano-3,6-dihexylamino-benzoquinone.*—Orange needles. Infrared spectrum: C≡N: 2185 cm.$^{-1}$, C=O (very weak): 1654 cm.$^{-1}$. Melting point: 225–226° C. (partial decomposition).

By heating with sodium cyanide in methanolic solution, there are obtained solutions of the sodium salt of tetracyano-hydroquinone having a red fluorescence and which are worked up in the manner indicated in Example 1(c).

The reaction of, for example, sodium hydroxide solution with the above-mentioned dicyano-diaminoquinones yields the sodium salt of cyananilic acid.

60 mg. of 2,5-dicyano-3,6-dimorpholino-benzoquinone are boiled together with 5 cc. of 2N—HaOH until a clear yellow solution is formed. This solution is filtered and cooled, whereupon the sodium salt of the cyananilic acid separates in the form of long needles. The product is filtered off and washed with ether. 45 mg. of sodium cyananilate are obtained (more than 90% of the theoretical yield).

EXAMPLE 4

0.5 g. of 2,5-dicyano-hydroquinone is suspended in 6 cc. of carbon tetrachloride and stirred for 1 hour with 0.2 cc. of nitrous gases. The solution is suction-filtered, the brown-yellow residue is washed with carbon tetrachloride and extracted with hot benzene. The addition of petroleum ether causes precipitation of an ocher-colored product. This product is suspended in anhydrous chloroform and into this suspension is introduced hydrogen chloride for 2 hours. The product is then filtered off, the residue is dissolved in hot, dilute sodium hydroxide solution and allowed to cool. The sodium salt of cyananilic acid separates in the form of yellow needles which are worked up in the manner described in Example 2(b).

The 2,5-dicyano-3,6-dibromo-benzoquinone used as the starting substance can be prepared in the following manner:

(1) *2,5-dihydroxy-terephthalic acid* was obtained in a yield of 90% according to the method described in J. Org. Chem. 19, 510 (1954).

(2) *2,5-dihydroxy-diethyl-terephthalate.*—78 g. of dihydroxy-diethyl-terephthalate are boiled under reflux for 3 hours together with 330 cc. of absolute alcohol and 25 cc. of alcoholic HCl. The solution is then evaporated to dryness, the residue is then again combined with 500 cc. of alcohol and 30 cc. of alcoholic HCl and the whole is then boiled for three hours under reflux. After removal of the solvent by distillation, the brown residue is recrystallized from alcohol. There are obtained 81 mg. (85% of the theoretical yield) of the above-identified ester which is found to melt at 133° C.

(3) *2,5 - dihydroxy - 3,6 - dibromo-diethyl-terephthalate.*—The substance described in Berichte der Deutschen Chemischen Gesellschaft 21, 1759 (1888) is prepared according to the following method: 81 g. of dihydroxy-diethyl-terephthalate are dissolved in 800 cc. of chloroform dried over CaCl$_2$, and 89 g. of anhydrous AlCl$_3$ are added thereto. To the stirred suspension are added 32.6 cc. of bromine and the whole is heated with precaution on the water bath. Reaction sets in soon and becomes more and more violent with evolution of HBr. The more violently the reaction proceeds, the sooner is the bromine consumed and the better are the yields. The batch is therefore kept boiling violently until the solvent that reflows from the reflux cooler is almost colorless. This is the case mostly after about 1 hour. The chloroform is then removed as completely as possible by distillation (finally under reduced pressure), and the red, solid residue is dissolved in warm 2N—NaOH, filtered and acidified. The separated yellow precipitate is filtered off. The crude product, obtained in a yield of 155 g. (87% of the theoretical yield), in most cases still contains some impurities; in order to purify it, it is dissolved in dilute sodium hydroxide solution and then precipitated again by concentrated HCl. An almost white product is obtained when the afore-mentioned product is dissolved subsequently in hot alcohol, boiled shortly with charcoal, filtered, and the filtrate is combined with about the same quantity of water. The crystal powder that precipitates thereupon has a melting point of 148–152° C. and is sufficiently pure for further treatment.

(4) *2,5 - dimethoxy - 3,6 - dibromo-diethyl-terephthalate.*—59 g. of dihydroxy-dibromo-diethyl-terephthalate are dissolved in 325 cc. of 2N—NaOH and shaken for half an hour with 30 cc. of dimethylsulfate. The suspension so formed is then again heated for half an hour to 60° C., allowed to cool and filtered. The filtrate obtained is heated to 50° C., 120 cc. of 2N—NaOH and again 20 cc. of dimethyl sulfate are added. The whole is again shaken for half an hour, heated for half an hour to 60° C., cooled and filtered. This operation is repeated once or twice, while taking care that the solution remains always alkaline.

The combined, almost white crystalline residues are washed with water and dried. The yield is 54 g. (86% of the theoretical yield). The product melts at 98° C.

(5) *2,5-dimethoxy-3,6-dibromo-terephthalic acid.*—56 g. of dimethoxy-dibromo-diethyl-terephthalate are heated for one hour with reflux in a solution of 55 g. of KOH in 280 cc. of methanol. After short time a clear solution is formed, and the potassium salt of the acid formed precipitates. The solution is evaporated to dryness, the residue is dissolved in water, filtered and the filtrate is acidified with concentrated hydrochloric acid. A white crystal magma is obtained. After suction-filtration and drying, there are obtained 44 g. of the above-identified product (93% of the theoretical yield) which decomposes upon heating.

(6) *2,5-dimethoxy-3,6-dibromo-terephthalic acid-chloride.*—440 cc. of thionyl chloride and 44 g. of dimethoxy dibromo-terephthalic acid are boiled with reflux on the water bath. After about 2 hours there forms a weakly yellow clear solution and the evolution of HCl practically ceases. After about 3 hours, the whole is evaporated to dryness and the acid chloride remains behind as crystalline magma. It is used for the further treatment without purification.

(7) *2,5-dimethoxy - 3,6 - dibromo - terephthalic acid-diamide.*—The crude acid chloride prepared from 44 g. of the corresponding acid is dissolved in 450 cc. of anhydrous benzene. A moderately strong NH$_3$ stream is introduced into this solution, while cooling. It is of advantage to stir intensively. The thick paste formed thereby is filtered off, freed from benzene by drying and freed from ammonium chloride by repeated washing with water. As a residue, there remain behind 37.7 g. of a white loose powder (86.4% of the theoretical yield). The compound crystallizes from nitrobenzene in the form of colorless crystals which decompose above 280° C.

*Analysis.*—Calculated: 31.40% C; 2.62% H; 7.34% N; 41.80% Br. Found: 31.68% C; 2.86% H; 7.50% N; 41.70% Br.

(8) *2,5-dimethoxy-3,6-dibromo-terephthalic acid-dinitrile.*—9.5 g. of anhydrous dimethoxy-dibromo-terephthalic acid-diamide are dissolved in 50 cc. of absolute dimethyl-formamide (previously distilled over CaH₂). 10 cc. of twice distilled thionyl chloride are then added to the brown solution. During addition, the mixture is cooled by means of ice and common salt. The temperature should be as low as possible, preferably not over 30° C. When the reaction has ceased, the vessel is removed from the cooling mixture and allowed to stand at room temperature for 1 hour. Then the whole is again cooled strongly and the precipitated colorless crystals are filtered off. There are obtained 4.9 g. of dimethoxy-dibromo-terephthalic acid dinitrile (57.7% of the theoretical yield). The compound, recrystallized from glacial acetic acid, melts at 240° C. and shows a nitrile band in its infrared spectrum.

(9) *2,5-dihydroxy-3,6-dibromo-terephthalic acid-dinitrile.*—7 g. of finely pulverized dimethoxy-dibromo-terephthalic acid-dinitrile are added at 175–185° C. to a melt of 32 g. of anhydrous AlCl₃ and 6.5 g. of NaCl. The mixture is stirred and allowed to stand at this temperature for half an hour. Then it is allowed to cool, the greenish melt cake is pulverized and boiled with strong hydrochloric acid. The green-grey residue obtained after centrifugation is washed with water and dried. Yield: 5.9 g. (92.5% of the theoretical yield). The diacetate melts at 218° C.

(10) *2,5-dicyano-3,6-dibromo-benzoquinone.*—To a suspension of 12.1 g. of 2,5-dihydroxy-3,6-dibromo-terephthalic acid-dinitrile in 120 cc. of anhydrous carbon tetrachloride 12 cc. of condensed nitrous gases are added. The mixture is stirred for one hour at room temperature, with exclusion of moisture, and then filtered. The yellow quinone formed is washed with anhydrous carbon tetrachloride, dissolved in warm, anhydrous benzene, and the solution which has been previously somewhat concentrated in vacuo is combined with an equal volume of n-heptane. The yellow crystal powder that precipitates is suction-filtered and freed from heptane under exclusion of moisture. There are obtained 9.5 g. of the above-identified quinone (95% of the theoretical yield) which shows no melting point but turns slowly black when heated.

Its infrared spectrum shows besides the nitrile band a strong carbonyl band.

*Analysis.*—Calculated: 30.39% C; 8.86% N; 50.6% Br. Found: 29.66% C; 9.27% N; 51.2% Br.

We claim:
1. The compound of the formula

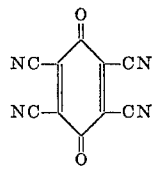

2. The compound of the formula

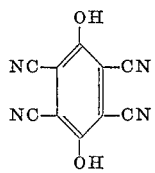

3. A process of preparing 2,3,5,6-tetracyano-benzoquinone-(1,4) which comprises contacting a compound of the formula

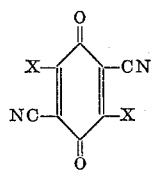

wherein X represents a member selected from the group consisting of halogen, lower alkoxy, and

in which $R_1$ and $R_2$ each stand for a member selected from the group consisting of hydrogen, lower alkyl, lower phenyl-alkyl and, together with the nitrogen atom, a saturated cyclic amine having from two to five $CH_2$ groups in which the polymethylene chain may be interrupted by oxygen, with a member selected from the group consisting of alkali metal cyanides and alkaline earth metal cyanides in a lower alkanol and contacting the tetracyano-hydroquinone thus obtained with nitrous gases.

4. A process of preparing 2,3,5,6-tetracyano-benzoquinone-(1,4) which comprises contacting a compound of the formula

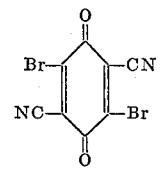

with sodium cyanide in essentially anhydrous methanol and contacting the tetracyano-hydroquinone thus obtained with nitrous gases.

5. A process of preparing 2,3,5,6-tetracyano-benzoquinone-(1,4) which comprises contacting a compound of the formula

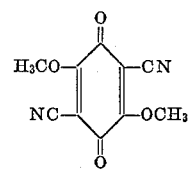

with sodium cyanide in essentially anhydrous methanol and contacting the tetracyano-hydroquinone thus obtained with nitrous gases.

6. A process of preparing 2,3,5,6-tetracyano-benzoquinone-(1,4) which comprises contacting a compound of the formula

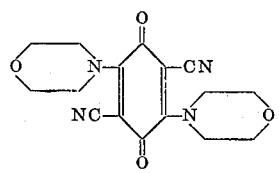

with sodium cyanide in essentially anhydrous methanol and contacting the tetracyano-hydroquinone thus obtained with nitrous gases.

7. A process of preparing 2,3,5,6-tetracyano-benzoquinone-(1,4) which comprises contacting a compound of the formula

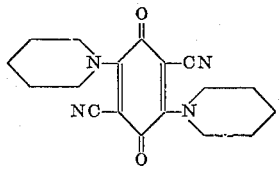

with sodium cyanide in essentially anhydrous methanol and contacting the tetracyano-hydroquinone thus obtained with nitrous gases.

8. A process of preparing 2,3,5,6-tetracyano-benzoquinone-(1,4) which comprises contacting a compound of the formula

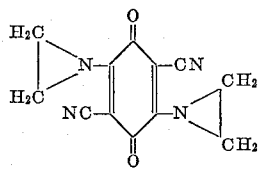

with sodium cyanide in essentially anhydrous methanol and contacting the tetracyano-hydroquinone thus obtained with nitrous gases.

9. A process of preparing 2,3,5,6-tetracyano-benzoquinone-(1,4) which comprises contacting a compound of the formula

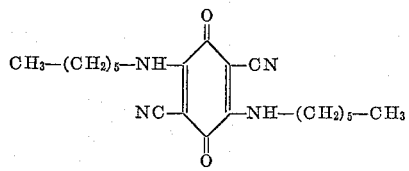

with sodium cyanide in essentially anhydrous methanol and contacting the tetracyano-hydroquinone thus obtained with nitrous gases.

No references cited.